M. A. YEAKLEY.
LUBRICATION FOR ENGINE VALVES.
APPLICATION FILED DEC. 30, 1919.
1,414,244.
Patented Apr. 25, 1922.
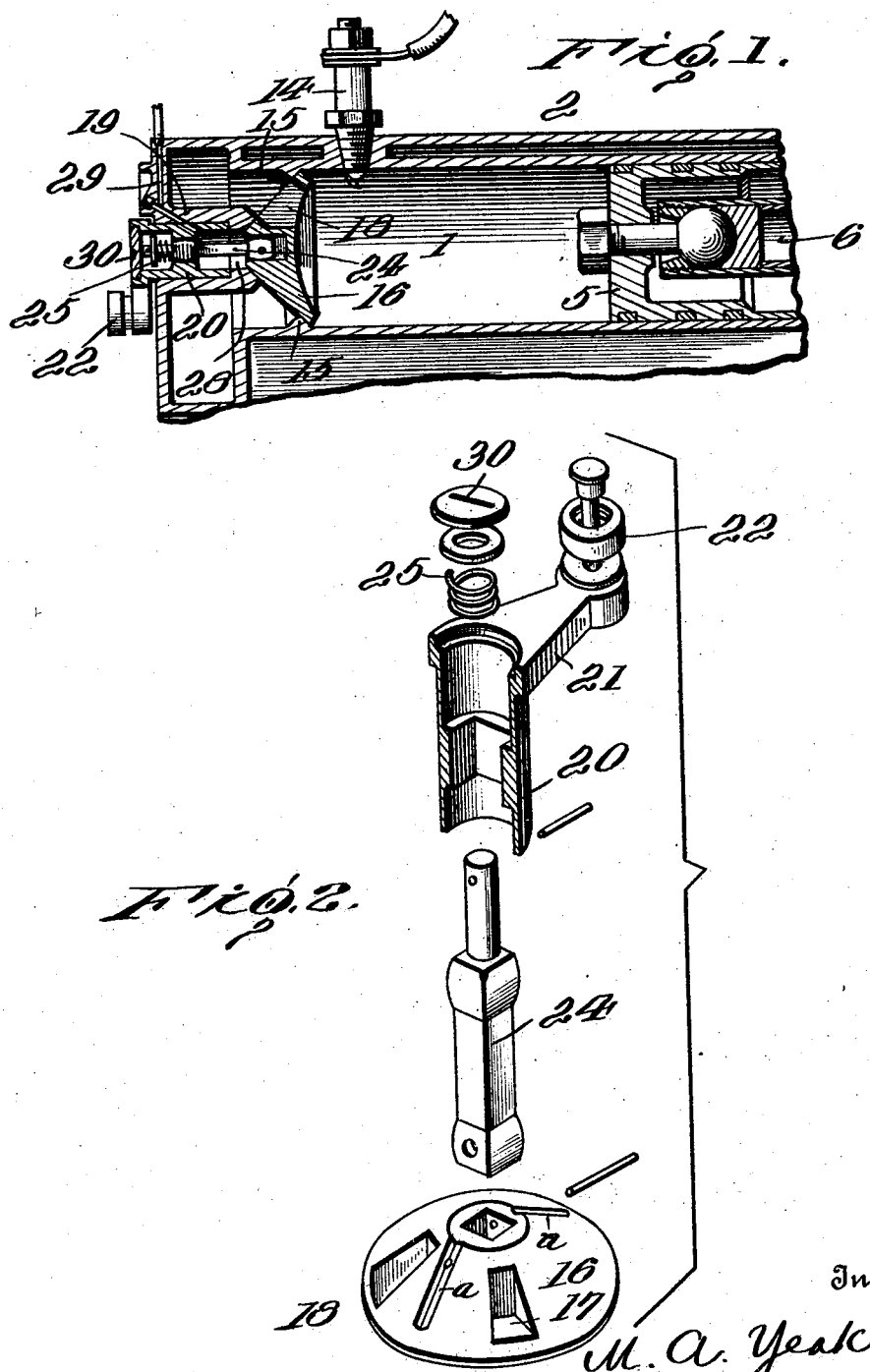

UNITED STATES PATENT OFFICE.

MELVIN A. YEAKLEY, OF CANTON, OHIO.

LUBRICATION FOR ENGINE VALVES.

1,414,244.  Specification of Letters Patent.  Patented Apr. 25, 1922.

Original application filed May 17, 1915, Serial No. 28,669. Divided and this application filed December 30, 1919. Serial No. 348,456.

*To all whom it may concern:*

Be it known that I, MELVIN A. YEAKLEY, a citizen of the United States, residing at Canton, in the county of Stark and State of Ohio, have invented certain new and useful Improvements in Lubrications for Engine Valves, of which the following is a specification, reference being had therein to the accompanying drawing.

This invention relates to improvements in lubrication of engine valves, and is a division of my application filed May 17th, 1915, Serial No. 28,669, for improvements in internal combustion engines, and pertains to the oiling of the conical oscillating valves.

The object of my present invention is to provide a simple and efficient oiling of the spring held oscillating conical valve for explosion engines.

Fig. 1 is a longitudinal sectional view of an engine cylinder with my improvement applied thereto.

Fig. 2 is a perspective view of the improved valve with its operating parts shown in disconnected relation.

Referring now to the drawings, a conical valve seat 15 is located within the head of the cylinder 1, and this valve seat is provided with inlet and exhaust openings, as will be understood. A conical valve 16 rests on this seat and it is provided with inlet and exhaust openings 17 and 18, for alternately registering with the exhaust openings of the valve seat 15.

The cylinder housing 1 is provided with an inwardly extending housing 19, which is arranged concentric to the valve 16 and journaled within this housing 19 is an oscillating socket 20, carrying at its outer end a crank arm 21.

The outer end of the crank-arm 21 has a pin carrying a roller 22, and this roller 22 moves in a cam groove, not shown, by which the crank-arm 21 and its socket 20 are oscillated, all of which is fully described in my aforesaid application.

I here show my valve 16 with a spiral flexible valve stem or connection 24, but as this forms the subject matter of a separate co-pending divisional application of my aforesaid application, it is unnecessary to further describe that here, except to say that a spring 25 surrounds the valve stem 24 and holds the valve to its seat 15.

My present improvement pertains to lubricating the oscillating valve 16, and this consists in providing the conical surface of the valve with radiating oil grooves $a$, the inner ends of the grooves being in communication with the interior of the housing 19. An oil-supply passage 26 has its inner end connecting with the housing 19 for supplying oil thereto, and the inner end of the housing 19 has a conical bearing 27 with the valve 16. Oil is therefore supplied in any suitable manner into the housing 19, and the inner end of the housing may be said to form an oil supply chamber 28. The oil passes from this chamber 28 into the grooves $a$ of the valve, as it is oscillated and the oil is supplied to the whole conical surface of the valve by what may be aptly termed a wipe pump action, which will spread oil over the entire valve seating surface. Oil may be supplied to the passage 26 in any desired manner, or it may be fed through an additional passage 29, as in Fig. 1. The outer end of the crank arm socket 20 will be closed by a suitable screw cap 30, for the purpose of retaining the oil within the socket to be supplied to the valve surface in the manner just described.

From the foregoing description it will be observed that the housing 19 and socket 20 constitutes an oil supply chamber from which the oil is supplied to the conical surface of the oscillating valve 16.

Attention is directed to the fact that the oil grooves $a$ of the valve 16 never come into communication with the inlet and exhaust ports, because the oscillation of the valve is so limited as to prevent such action. This communication of the oil grooves is prevented because should the oil grooves communicate with said ports, there would be an excess lubrication causing the usual objectionable carbon in the cylinders and on the valve.

Having thus described my invention, what I claim and desire to secure by Letters Patent is:

1. In an internal combustion engine, a conical valve and its seat therefor having each a gas passage therein, an oil passage extending radially between said valve and seat and arranged in such a manner that it is non-traversed by said gas passages when the valve is operated, whereby the oil is lightly wipe-pumped entirely around and over the valve seat and is prevented from flowing into the gas passage.

2. In an internal combustion engine, a conical valve and its seat therefor, having each a gas passage therein, an oil groove extending radially in the seating surface of said valve and located so that when the valve is operated it does not traverse the gas passage in said seat, whereby the oil is lightly wipe-pumped entirely around and over the valve seating surface and is prevented from flowing into the gas passage in said valve seat.

3. The combination with an explosion cylinder, having a conical valve seat at its head, a conical valve on said seat, the seat and valve having inlet and exhaust ports, the valve having radially arranged oil grooves in its conical surface, and means for oscillating the valve a limited distance to prevent the oil grooves from communicating with the inlet or exhaust ports of the valve seat.

4. An oscillating valve for internal combustion engines, comprising a valve-seat member having a conical valve seat, a conical valve member mounted for oscillation on said valve-seat member, said two members being provided with ports which are opened and closed by the oscillation of said valve member, and one of said members being provided with an oil passage on a portion which is between the ports of said member and engages the other member but which is always out of registry with the ports of such other member.

5. An oscillating valve for internal combustion engines, comprising a valve-seat member, a valve member mounted for oscillation on said valve-seat member, said two members being provided with ports which are opened and closed by the oscillation of said valve member, and one of said members being provided with an oil passage on a portion which is between the ports of said member and engages the other member but which is always out of registry with the ports of such other member.

In testimony whereof I hereunto affix my signature.

MELVIN A. YEAKLEY.

Witnesses:
M. M. WANAMAKER,
A. B. COVRELL.